US009210638B2

(12) United States Patent
Tomita et al.

(10) Patent No.: US 9,210,638 B2
(45) Date of Patent: Dec. 8, 2015

(54) APPARATUS AND METHOD FOR CONTROLLING SELECTION OF A HANDOVER DESTINATION

(71) Applicant: FUJITSU LIMITED, Kawasaki-shi, Kanagawa (JP)

(72) Inventors: Tetsuo Tomita, Setagaya (JP); Masanori Hasimoto, Yokohama (JP); Bun Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 13/846,619

(22) Filed: Mar. 18, 2013

(65) Prior Publication Data

US 2013/0260762 A1 Oct. 3, 2013

(30) Foreign Application Priority Data

Mar. 30, 2012 (JP) ................................ 2012-083276

(51) Int. Cl.
*H04W 36/30* (2009.01)
*H04W 36/00* (2009.01)

(52) U.S. Cl.
CPC .......... *H04W 36/30* (2013.01); *H04W 36/0083* (2013.01); *Y02B 60/50* (2013.01)

(58) Field of Classification Search
CPC ..... H04W 36/30; H04W 36/32; H04W 36/18; H04W 16/32
USPC ................................................ 455/436–444
See application file for complete search history.

(56) References Cited

U.S. PATENT DOCUMENTS

| | | | | |
|---|---|---|---|---|
| 6,363,252 | B1 * | 3/2002 | Hamalainen et al. | 455/436 |
| 6,701,150 | B1 * | 3/2004 | Huang et al. | 455/439 |
| 2005/0176440 | A1 * | 8/2005 | Sang et al. | 455/453 |
| 2006/0029021 | A1 * | 2/2006 | Sakawa et al. | 370/331 |
| 2006/0030323 | A1 * | 2/2006 | Ode et al. | 455/436 |
| 2009/0190500 | A1 * | 7/2009 | Ji et al. | 370/254 |
| 2009/0247150 | A1 * | 10/2009 | Fischer et al. | 455/425 |
| 2009/0252113 | A1 | 10/2009 | Take | |

FOREIGN PATENT DOCUMENTS

| | | | |
|---|---|---|---|
| JP | 2011-019039 | A | 1/2011 |
| WO | WO 2007/057977 | A1 | 5/2007 |

OTHER PUBLICATIONS

Japanese Office Action issued Sep. 1, 2015; Japanese Application No. 2012-083276.

* cited by examiner

*Primary Examiner* — William Nealon
(74) *Attorney, Agent, or Firm* — Arent Fox LLP

(57) ABSTRACT

An apparatus acquires a parameter set including first and second parameter subsets. The first parameter subset stores first throughput and first power consumption that are measured, before a handover of a mobile station, by each base-station belonging to a measurement target group including a plurality of handover-candidate base-stations and a handover-source base-station. The second parameter subset stores second throughput and second power consumption that are estimated by each base-station belonging to the measurement target group, on the assumption that the mobile station is handed over to the each base-station. The apparatus calculates, before and after the handover, for each of the plurality of handover-candidate base-stations, a total energy efficiency of a pair of the handover-source base-station and the each of the plurality of handover-candidate base-stations, based on the parameter set, and selects, from among the plurality of handover-candidate base-stations, the handover-destination base-station based on the calculated total energy efficiencies.

5 Claims, 15 Drawing Sheets

APPARATUS AND METHOD FOR CONTROLLING SELECTION OF A HANDOVER DESTINATION

CROSS-REFERENCE TO RELATED APPLICATION

This application is based upon and claims the benefit of priority of the prior Japanese Patent Application No. 2012-083276, filed on Mar. 30, 2012, the entire contents of which are incorporated herein by reference.

FIELD

The embodiments discussed herein are related to apparatus and method for controlling selection of a handover destination.

BACKGROUND

Mobile communication systems are becoming sophisticated and complicated from a 3.5-generation mobile communication system, which is widely used nowadays, that is, 3.5 G, to a 3.9-generation mobile communication system, that is, 3.9 G. Furthermore, it is expected that a fourth-generation mobile communication system, that is, 4 G service, will start. As mobile communication systems are becoming sophisticated and complicated in this way, a technique called a self organizing network (SON) has become a center of attention. The SON is a technique for automating and optimizing the installation, operation, and so on of mobile communication systems. In the future, a situation in which 3.5 G-, 3.9 G-, and 4 G-network systems are mixed will occur, as illustrated in FIG. 1. FIG. 1 is a diagram illustrating an example of the mobile communication system in which 3.5 G, 3.9 G, and 4 G are mixed. Actual examples include W-CDMA for 3.5 G, Long Term Evolution (LTE) for 3.9 G, and LTE-Advanced for 4 G.

Examples of the main functions of SON include self-configuration, self-optimization, and self-healing, as described below.

(1) Self-configuration function: the function of automatically, not manually, connecting to a network and setting adjacent cells, system parameters, and so on when a base station is to be deployed. This function may reduce man-hours and workload for the deployment.

(2) Self-optimization function: the function of automatically tuning a mobile communication system by adjusting a handover to an adjacent cell, adjusting the interference with an adjacent cell, and so on. This function is performed on the basis of measurement data collected at the nodes of the mobile communication system (that is, a base station, an exchange, a mobile station, and so on). Examples of the handover adjustment include adjustment of a threshold value for changes in wireless quality, which is used to determine whether to execute a handover. Examples of the interference adjustment include adjustment of transmission power in the individual cells and adjustment of transmission timing. This function may improve the communication quality of the mobile communication system.

(3) Self-healing function: the function of automatically detecting a problem in a mobile communication system and automatically specifying and analyzing the cause and restoring the system. This function may reduce man-hours and workload for maintaining the mobile communication system.

With a recent increase in mobile traffic and ecological awareness, effective use of wireless resources and reduction in the power consumption of the entire network by using the self-optimization function is becoming important.

For the effective use of the wireless resources, mobile stations are distributed to a plurality of cells in the relate art. This distributed processing is performed on the basis of the number of mobile stations under the control of a base station, throughput, and call connection load, measured by the base station. The distributed processing prevents decrease in throughput per mobile station due to concentration of the mobile stations to one cell. For example, there exists a method for moving, that is, handing over, a mobile station present in a macrocell to a microcell.

Examples of a method for achieving more effective use of the wireless resources are as follows: a first method is a method of control in consideration of not only the number of mobile stations, throughput, and call connection load but also the moving state or distribution of the mobile stations. In this method, a mobile station at rest is preferentially handed over to a microcell because a mobile station that is quickly moving at high speed goes out of a microcell. This allows the wireless resources to be stably utilized. A second method is a method of controlling not only handover but also the direction of radio waves transmitted from the base station and the transmission power in connection therewith. This method directs the radio waves to an area in which the density of mobile stations is high and increases the transmission power. This may increase the proportion of mobile stations having high wireless quality. Since a larger volume of data may be transmitted with the same wireless resources as the wireless quality increases, the use efficiency of the wireless resources may be enhanced.

Furthermore, the following control has conventionally been performed to reduce the power consumption of a network. Mobile stations are concentrated to a predetermined cell or sector. This concentration processing is performed based on the number of mobile stations under the control of a base station, throughput, and call connection load measured by the base station. This concentration processing may reduce electrical power for a base station corresponding to a cell in which the number of mobile stations has decreased as a result of movement of the mobile stations. For base stations having a separate processing unit for each sector, electrical power to be supplied to a processing unit corresponding to a sector in which the number of mobile stations is decreased may be reduced by concentrating mobile stations in a predetermined sector.

Related art is disclosed in Japanese Laid-open Patent Publication No. 2011-19039.

SUMMARY

According to an aspect of the invention, there is provided an apparatus for controlling selection of a handover destination of a mobile station. The apparatus includes an acquisition unit and a controller. The acquisition unit acquires a parameter set including first and second parameter subsets. The first parameter subset stores first throughput and first power consumption that are measured, before a handover of the mobile station, by each of base stations belonging to a measurement target group including a plurality of handover-candidate base stations and a handover-source base station, where the handover-source base station is a base station from which the mobile station is to be handed over to the handover-destination, and the first throughput is measured based on the wireless quality between the mobile station and the each base station belonging to the measurement target group. The second parameter subset stores second throughput and second power consumption that are estimated by the each base station belonging to the measurement target group, on the assumption that the mobile station is handed over to the each base station. The controller calculates, before and after the handover of the mobile station, for each of the plurality of handover-candidate base stations, a total energy efficiency for a pair of the handover-source base station and the each of the plurality of handover-candidate base stations, based on the parameter set, and selects a handover-destination base station to which the mobile station is to be handed over from the handover-source base station, from among the plurality of handover-candidate base stations, based on the total energy efficiencies that have been calculated, before and after the handover, for the respective plurality of handover-candidate base stations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

It is preferable to achieve both of the effective use of wireless resources and reduction in the power consumption of the entire network at the same time. However, one is achieved by distributing the mobile stations, and the other is achieved by concentrating the mobile stations as described above. Accordingly, it is difficult to achieve both at a sufficient level by simply combining the above-mentioned two methods.

Embodiments of a handover control apparatus, a mobile station, and a handover control method disclosed in this application will be described hereinbelow in detail with reference to the drawings. The handover control apparatus, the mobile station, and the handover control method disclosed in this application are not limited to the embodiments. In the embodiments, configurations with the same function are given the same reference signs, and duplicate descriptions will be omitted.

First Embodiment

Outline of Communication System

Figure 1:
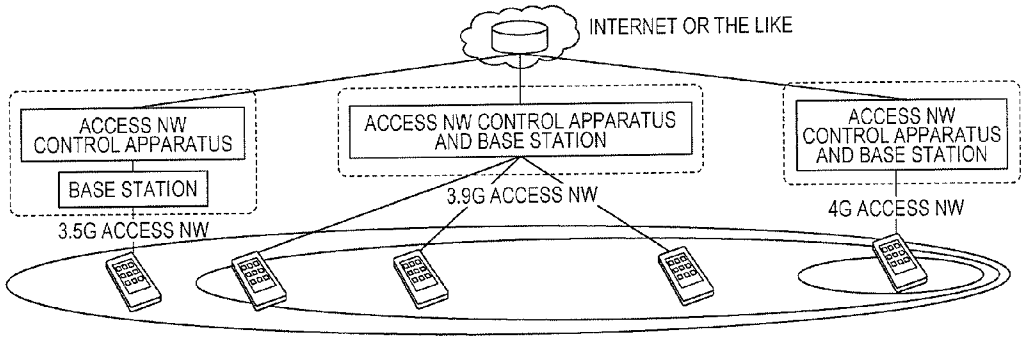
FIG. 1 is a diagram illustrating an example of a mobile communication system in which 3.5 G, 3.9 G, and 4 G are mixed.
Figure 2:
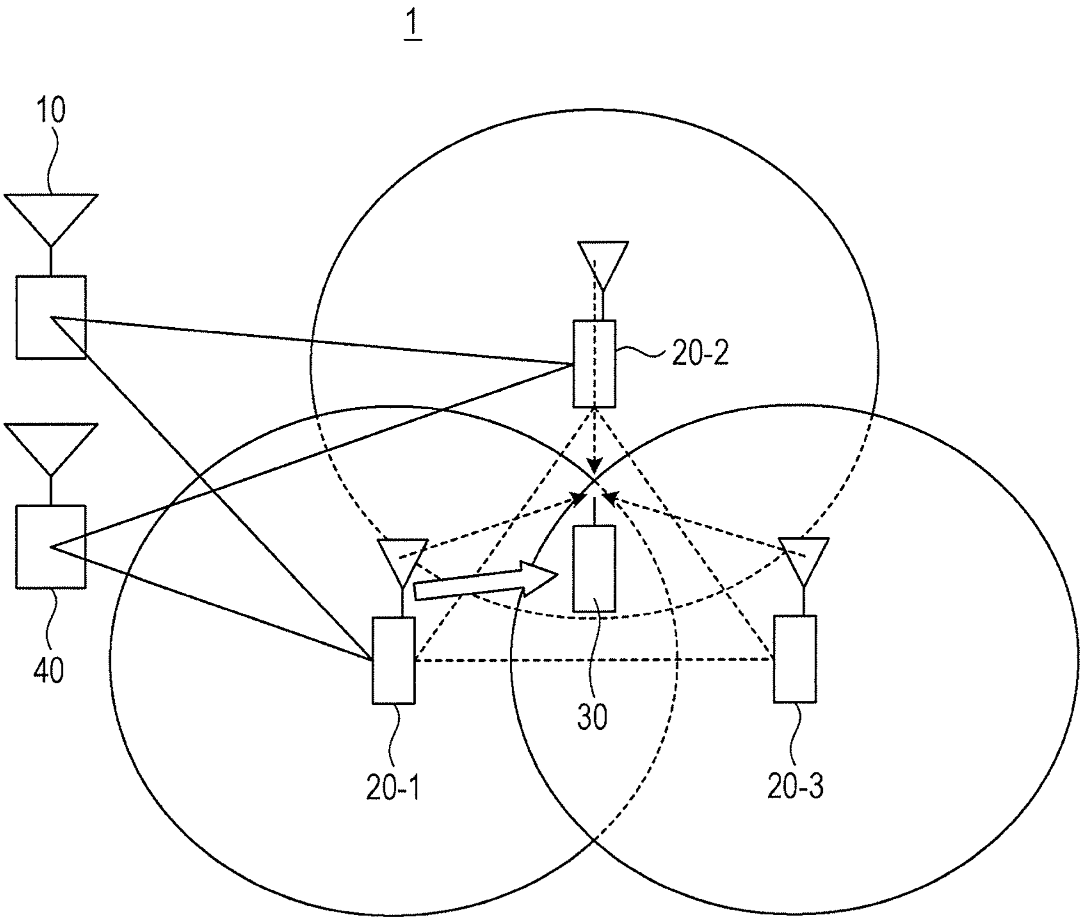
FIG. 2 is a diagram illustrating an example of a communication system, according to a first embodiment.

FIG. 2 is a diagram illustrating an example of a communication system, according to a first embodiment. In FIG. 2, a communication system 1 includes a handover control apparatus 10, base stations 20-1, 20-2, 20-3, a mobile station 30, and an exchange 40.

The mobile station 30 performs communication via the base station 20-1. In other words, the base station 20-1 is a handover-source base station of the mobile station 30 (hereinafter, will be also referred to as "handover (HO)-source base station").

Furthermore, the mobile station 30 receives reference signals transmitted from the HO-source base station and base stations other than the HO-source base station, which are present in the vicinity of the mobile station 30, (hereinafter, will be also referred to as "handover (HO)-destination-candidate base stations" or "handover (HO)-candidate base stations"). A group including the HO-source base station and the plurality of HO-destination-candidate base stations will be also referred to as "measurement target group". In the state illustrated in FIG. 2, the base stations 20-2 and 20-3 are HO-destination-candidate base stations.

The mobile station 30 measures the wireless quality between the individual base stations 20 belonging to the measurement target group and the mobile station 30 on the basis of the received reference signals. The measurement results on the individual base stations 20 belonging to the measurement target group are associated with identification information of the base stations 20 and are stored in a measurement report message which is transmitted to the HO-source base station 20-1. The measurement results on the individual HO-destination-candidate base stations 20-2 and 20-3 are transmitted to the individual HO-destination-candidate base stations 20-2 and 20-3 by the HO-source base station 20-1.

Each of the base stations 20-1, 20-2, and 20-3 measures current values of parameters in a "parameter set" and estimates the values of the parameters on the assumption that the mobile station 30, which is the target of handover control, is handed over to a cell or sector of each of the base stations 20-1, 20-2, and 20-3. The parameter set includes, as parameters, the throughput and power consumption of the individual base stations 20-1, 20-2, and 20-3. The parameter set measured or estimated in the individual base stations 20-1, 20-2, and 20-3 is transmitted to the handover control apparatus 10.

Based on the parameter sets obtained from the base stations 20-1, 20-2, and 20-3, the handover control apparatus 10 determines whether to perform a handover of the mobile station 30, and selects a handover (HO)-destination base station to which the mobile station 30 is to be handed over, from among the plurality of HO-destination-candidate base stations 20-2 and

20-3, when it is determined that the mobile station 30 is to be handed over. The determination whether to perform a handover and the selection of the HO-destination base station 20 are performed based on "energy efficiency". For example, the ratio of the total throughput to the power consumption of each base station 20 may be used as the energy efficiency, where the unit of the energy efficiency is [bps/W] or [bit/J].

In the case where it is determined that the mobile station 30 is to be handed over, data addressed to the mobile station 30 is transmitted to the HO-destination base station 20-2 (20-3) instead of the HO-source base station 20-1 by the exchange 40. Thus, the mobile station 30 receives the data addressed to itself via the HO-destination base station 20-2 (20-3).

Configuration of Handover Control Apparatus

Figure 3:
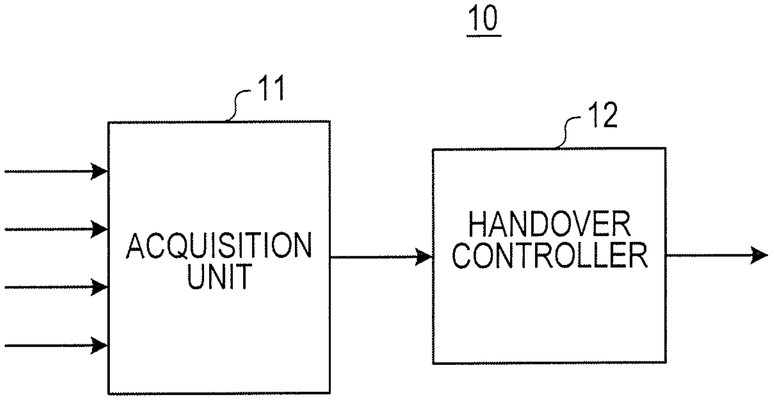
FIG. 3 is a diagram illustrating a configuration example of a handover control apparatus, according to a first embodiment.

FIG. 3 is a diagram illustrating a configuration example of a handover control apparatus, according to a first embodiment. In FIG. 3, the handover control apparatus 10 includes an acquisition unit 11 and a handover controller 12.

The acquisition unit 11 acquires parameter sets from the measurement target group and outputs the parameter sets to the handover controller 12. For example, first, a parameter set includes measured values of the throughput and power consumption of the HO-source base station 20-1 before a handover and estimated values of the throughput and power consumption after a handover. Secondly, a parameter set includes measured values of the throughput and power consumption of each of the individual HO-destination-candidate base stations 20-2 and 20-3 before the handover and estimated values of the throughput and power consumption after a handover.

Based on the parameter sets received from the acquisition unit 11, the handover controller 12 determines whether to hand over the mobile station 30, and selects a HO-destination base station from among the plurality of HO-destination candidate base stations 20-2 and 20-3 when it is determined that the mobile station 30 is to be handed over.

For example, the handover controller 12 calculates a total energy efficiency of a pair of the HO-source base station 20-1 and the HO-destination-candidate base station 20-2 (20-3) before and after a handover. The calculation is performed for each of the HO-destination-candidate base stations 20-2 and 20-3.

Based on the calculated energy efficiencies of the respective pairs before and after the handover, the handover controller 12 specifies a pair whose energy efficiency increases most after the handover as compared with that before the handover. The handover controller 12 then selects the HO-destination-candidate base station 20-2 (20-3) of the specified pair as a HO-destination base station.

For example, the handover controller 12 calculates total energy efficiencies of each of the above-mentioned pairs before and after a handover, and calculates the difference between the calculated total energy efficiencies by subtracting the total energy efficiency before the handover from the total energy efficiency after the handover.

Then, the handover controller 12 specifies a pair whose difference calculated is the largest, and selects the HO-destination-candidate base station 20-2 (20-3) of the specified pair as a HO-destination base station.

Here, the following equations may be used to calculate the energy efficiency:

$$Eff\_1=(R\_1,1+R\_1,2)/(W\_1,1+W\_1,2)$$

$$Eff\_2=(R\_2,1+R\_2,2)/(W\_2,1+W\_2,2)$$

Where Eff_1 is the total energy efficiency of a pair before a handover, Eff_2 is the total energy efficiency of the pair after the handover, W is the power consumption, and R is the throughput. The first figures added to W and R indicate whether they are values before a handover or values after the handover, and the second values indicate whether they are values of the HO-source base station 20-1 or the values of the HO-destination-candidate base station 20-2 (20-3). In this case, the first value, 1, indicates a value before a handover, and 2 indicates a value after a handover. The second value, 1, indicates the HO-source base station 20-1, and 2 indicates the HO-destination-candidate base station 20-2 (20-3).

According to the first embodiment, as described above, in the handover control apparatus 10, the handover controller 12 calculates a total energy efficiency of each pair of the HO-source base station 20-1 and the HO-destination -candidate base station 20-2 (20-3) before and after a handover. Then, the handover controller 12 determines a HO-destination base station 20 based on the calculated energy efficiencies of the respective pairs before and after the handover. For example, the energy efficiency may be obtained as a ratio of total throughput to power consumption.

This allows a HO-destination base station to be determined on the basis of the energy efficiency that is an index in which the balance between the use efficiency of wireless resources and power consumption is taken into account. Furthermore, since the HO-destination base station is determined on the basis of not the energy efficiency of each base station but the total energy efficiencies of each of the pairs before and after a handover, effective use of wireless resources and reduction in power consumption of the overall network are expected to be achieved.

Second Embodiment

A second embodiment is an embodiment in which a handover control apparatus is applied to a base station.

Configuration of HO-Source Base Station

Figure 4:
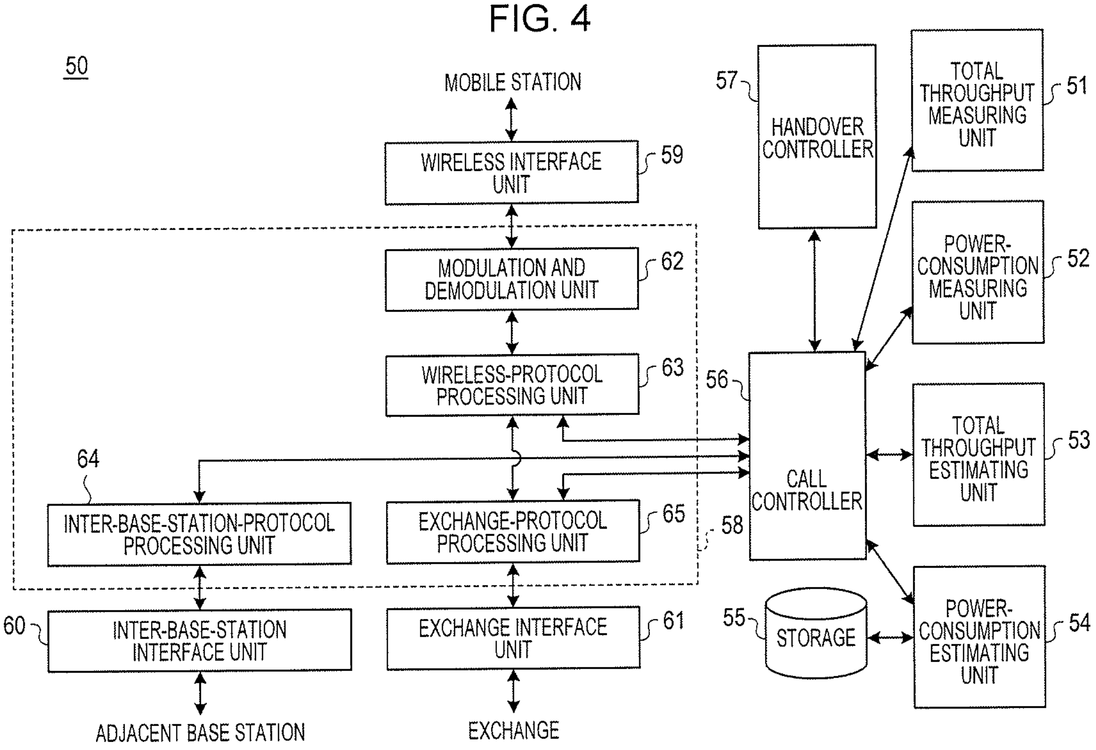
FIG. 4 is a diagram illustrating a configuration example of a handover (HO)-source base station, according to a second embodiment.

FIG. 4 is a diagram illustrating a configuration example of a handover (HO)-source base station, according to a second embodiment. In FIG. 4, a HO-source base station 50 includes a total-throughput measuring unit 51, a power-consumption measuring unit 52, a total-throughput estimating unit 53, a power-consumption estimating unit 54, a storage 55, a call controller 56, a handover controller 57, a signal processing unit 58, a wireless interface unit 59, an inter-base-station interface unit 60, and an exchange interface unit 61. Here, the acquisition unit 11 of the handover control apparatus 10 corresponds to the call controller 56, and the handover controller 12 corresponds to the handover controller 57.

The total-throughput measuring unit 51 measures the total throughput of the HO-source base station 50. The total throughput may be measured by counting the number of packets transmitted by the HO-source base station 50 and the number of bytes of the packets.

The power-consumption measuring unit 52 measures power consumption of the HO-source base station 50. The power consumption may be measured in the similar manner in which the existing electrical appliances and so on measure and display the power consumption thereof.

The total-throughput estimating unit 53 estimates the total throughput after a handover. The total throughput after a handover may be measured by summing up the total throughput of the HO-source base station 50 before a handover measured by the total-throughput measuring unit 51 and a throughput, which will be described later, estimated from the wireless quality of the mobile station 90 that is a handover control target.

The estimation of the throughput from the wireless quality of the mobile station 90 may be performed on the basis of a scheduling logic of the wireless channel. The scheduling logic is a logic for obtaining the amount of wireless resources to be allocated to each of mobile stations depending on the wireless quality of each mobile station. When the amount of wireless resources allocated is obtained, the amount of data that is transmittable by the wireless resources may also be calculated.

For example, assume that the wireless resources of one cell are divided into 100 sub-resources, and the sub-resources are each allocated to one mobile station. It is also assumed that the scheduling logic is set so that the sub-resources are allocated to mobile stations, in order from a mobile station having the highest wireless quality. For example, 30 sub-resources, 25 sub-resources, and so on are allocated to the mobile stations in order from a mobile station having the highest wireless quality. In this case, the number of sub-resources allocated may be estimated on the basis of the order of the wireless quality of the handover target mobile station. Furthermore, since the amount of data that is transmittable for each sub-resource is calculated theoretically from a coding scheme and modulation scheme thereof, the throughput of the handover control target may also be estimated.

The power-consumption estimating unit 54 estimates the power consumption after a handover on the basis of the total throughput estimated by the total-throughput estimating unit 53 and the relationship between the total throughput and the power consumption.

The storage 55 stores, as a system parameter, the relationship used by the power-consumption estimating unit 54. The form of the relationship may be either a calculation expression or a table.

The call controller 56 transmits and receives control signals to and from HO-destination-candidate base stations 70 which will be described later, the mobile station 90, or the exchange 40, according to the calling process sequence. Furthermore, the call controller 56 acquires parameter sets from the HO-source base station 50 or the HO-destination-candidate base stations 70.

The handover controller 57 has a function similar to that of the above-mentioned handover controller 12. That is, the handover controller 57 determines, on the basis of the parameter sets received from the call controller 56, whether to hand over the mobile station 90, and selects a HO-destination base station from among the plurality of HO-destination-candidate base stations 70 when it is determined that the mobile station 90 is to be handed over.

For example, the handover controller 57 calculates the total energy efficiency of a pair of the HO-source base station 50 and each of the HO-destination-candidate base stations 70 before and after a handover. The calculation is performed for each of the HO-destination-candidate base stations 70.

Then, the handover controller 57 specifies a pair whose energy efficiency increases most after a handover as compared with that before a handover on the basis of the calculated energy efficiencies of the respective pairs before and after a handover. The handover controller 57 then selects, as a HO-destination base station, the HO-destination-candidate base station 70 of the specified pair.

The signal processing unit 58 performs transmission and reception processes on signals transmitted between the HO-source base station 50 and the HO-destination-candidate base stations 70, the mobile station 90, or the exchange 40. For example, the signal processing unit 58 includes a modulation and demodulation unit 62, a wireless-protocol processing unit 63, an inter-base-station-protocol processing unit 64, and an exchange-protocol processing unit 65.

The modulation and demodulation unit 62 modulates and demodulates communication data transmitted and received to and from the mobile station 90.

The wireless-protocol processing unit 63 terminates a wireless protocol for the mobile station 90.

The inter-base-station-protocol processing unit 64 terminates an inter-base-station protocol for another base station.

The exchange-protocol processing unit 65 terminates an exchange protocol for the exchange 40.

The wireless interface unit 59 transmits and receives a wireless signal to and from the mobile station 90 via an antenna.

The inter-base-station interface unit 60 transmits and receives signals to and from an adjacent base station via a transmission path.

The exchange interface unit 61 transmits and receives signals to and from the exchange 40 via a transmission path.

Configuration of HO-Destination-Candidate Base Station

Figure 5:
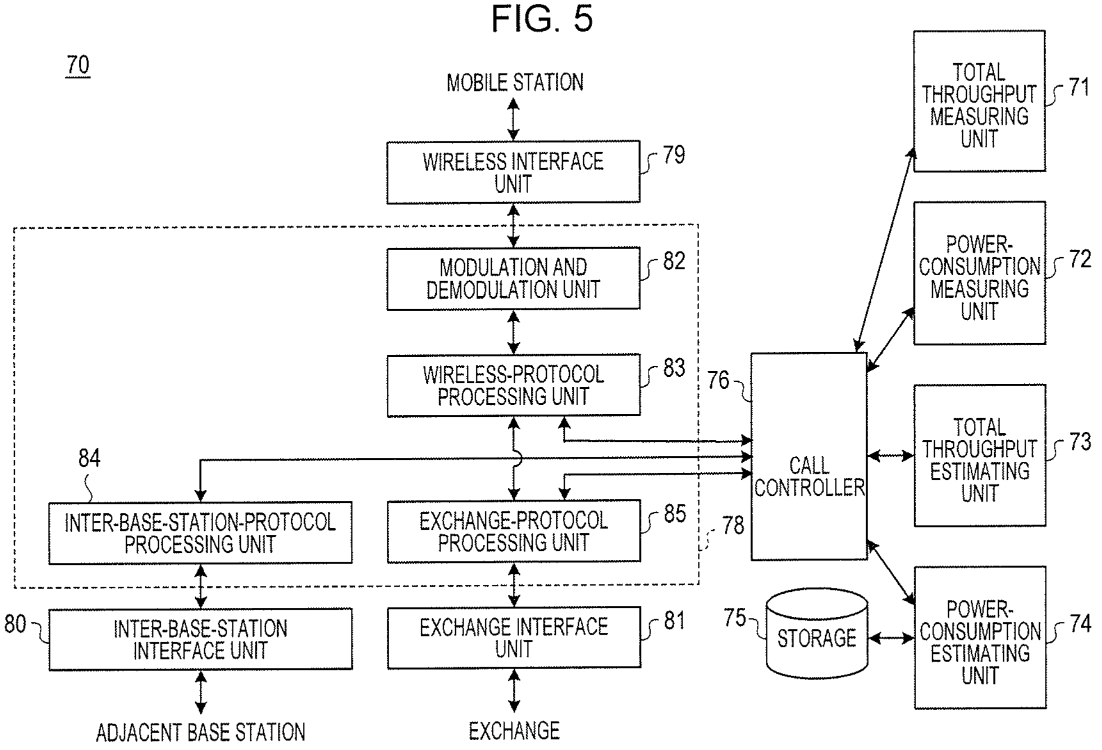
FIG. 5 is a diagram illustrating a configuration example of a handover-destination-candidate base station, according to a second embodiment.

FIG. 5 is a diagram illustrating a configuration example of a handover-destination-candidate base stations, according to a second embodiment. In FIG. 5, HO-destination-candidate base stations 70 each include a total-throughput measuring unit 71, a power-consumption measuring unit 72, a total-throughput estimating unit 73, a power-consumption estimating unit 74, a storage 75, a call controller 76, a signal processing unit 78, a wireless interface unit 79, an inter-base-station interface unit 80, and an exchange interface unit 81. The signal processing unit 78 includes a modulation and demodulation unit 82, a wireless-protocol processing unit 83, an inter-base-station-protocol processing unit 84, and an exchange-protocol processing unit 85. These functional units have the same functions as those of the functional units of the above-mentioned HO-source base station 50.

Configuration of Mobile Station

Figure 6:
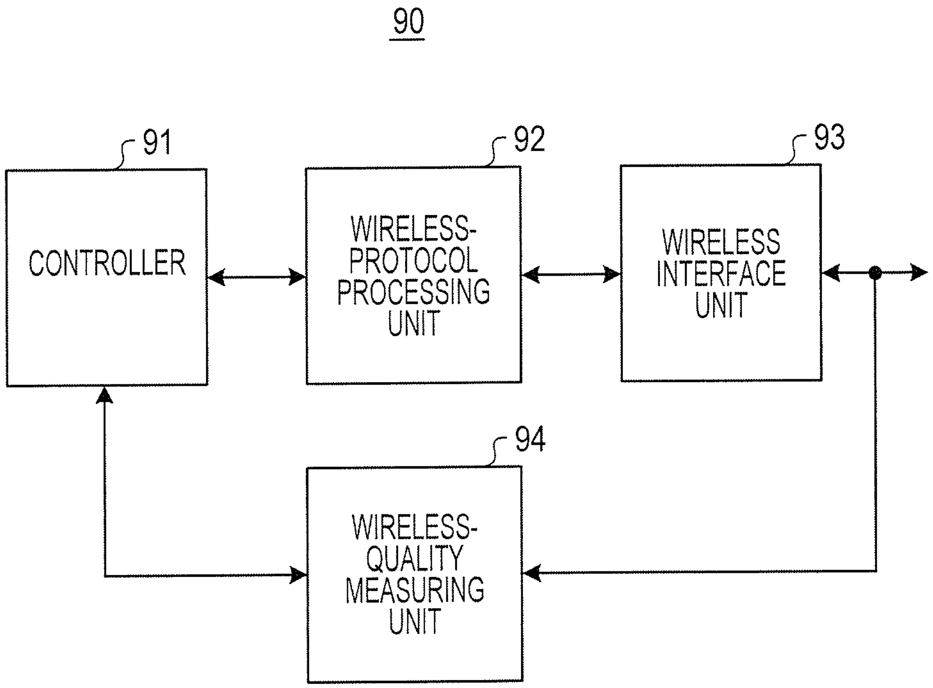
FIG. 6 is a diagram illustrating a configuration example of a mobile station, according to a second embodiment.

FIG. 6 is a diagram illustrating a configuration example of a mobile station, according to a second embodiment. In FIG. 6, the mobile station 90 includes a controller 91, a wireless-protocol processing unit 92, a wireless interface unit 93, and a wireless-quality measuring unit 94.

The controller 91 transmits and receives control signals to and from the HO-source base station 50 or the HO-destination-candidate base stations 70 according to the calling process sequence. Furthermore, the controller 91 controls measurement of the wireless quality by providing a measuring instruction to the wireless-quality measuring unit 94 and transmits a measurement report including the result of measurement to the HO-source base station 50.

The wireless-protocol processing unit 92 terminates a wireless protocol for the HO-source base station 50 or the HO-destination-candidate base stations 70.

The wireless interface unit 93 transmits and receives wireless signals to and from the HO-source base station 50 or the HO-destination-candidate base stations 70 via an antenna.

The wireless-quality measuring unit 94 measures the wireless quality between the mobile station 90 and the individual base stations on the basis of reference signals transmitted from the measurement target group, in accordance with an instruction from the controller 91. Then, the wireless-quality measuring unit 94 outputs the results of measurement to the controller 91 in association with the identification information of the individual base stations.

In other words, in the mobile station 90, the wireless-quality measuring unit 94 measures the wireless quality between the mobile station 90 and the individual base stations on the basis of reference signals transmitted from the base stations belonging to the measurement target group. Then, the controller 91, the wireless-protocol processing unit 92, and the wireless interface unit 93 transmit a measurement report including the wireless quality measured for all the base stations included in the measurement target group to the HO-source base station 50. This allows not only the HO-source base station 50 but also the HO-destination-candidate base stations 70 that receive the wireless quality via the HO-source base station 50, to estimate the total throughput and the power consumption.

Then, the controller 91, the wireless-protocol processing unit 92, and the wireless interface unit 93 receive, from the HO-source base station 50, a message including information about a HO-destination base station selected from among the plurality of HO-destination-candidate base stations 70. Then, the controller 91 switches a communication channel from a first channel to the HO-source base station 50 to a second channel to the HO-destination base station 70, on the basis of the received message.

Operation of Communication System

Figure 7:
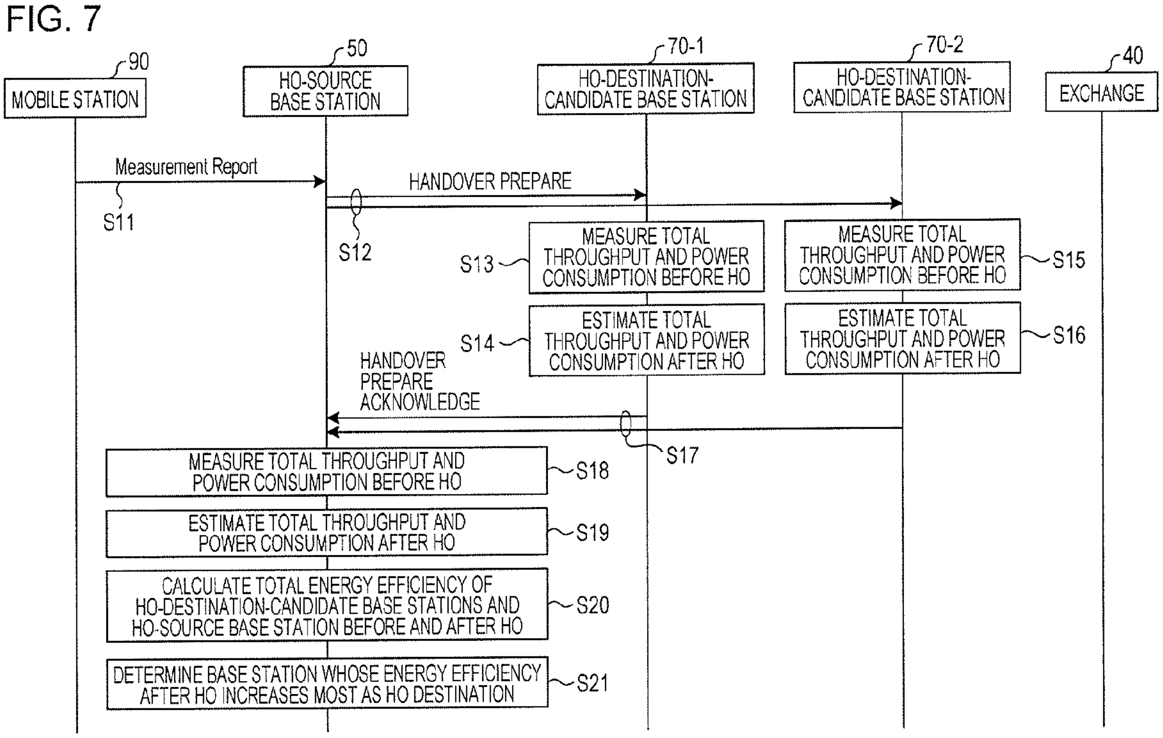
FIGS. 7 and 8 are diagrams illustrating an example of an operational sequence of a communication system, according to a second embodiment.
Figure 8:
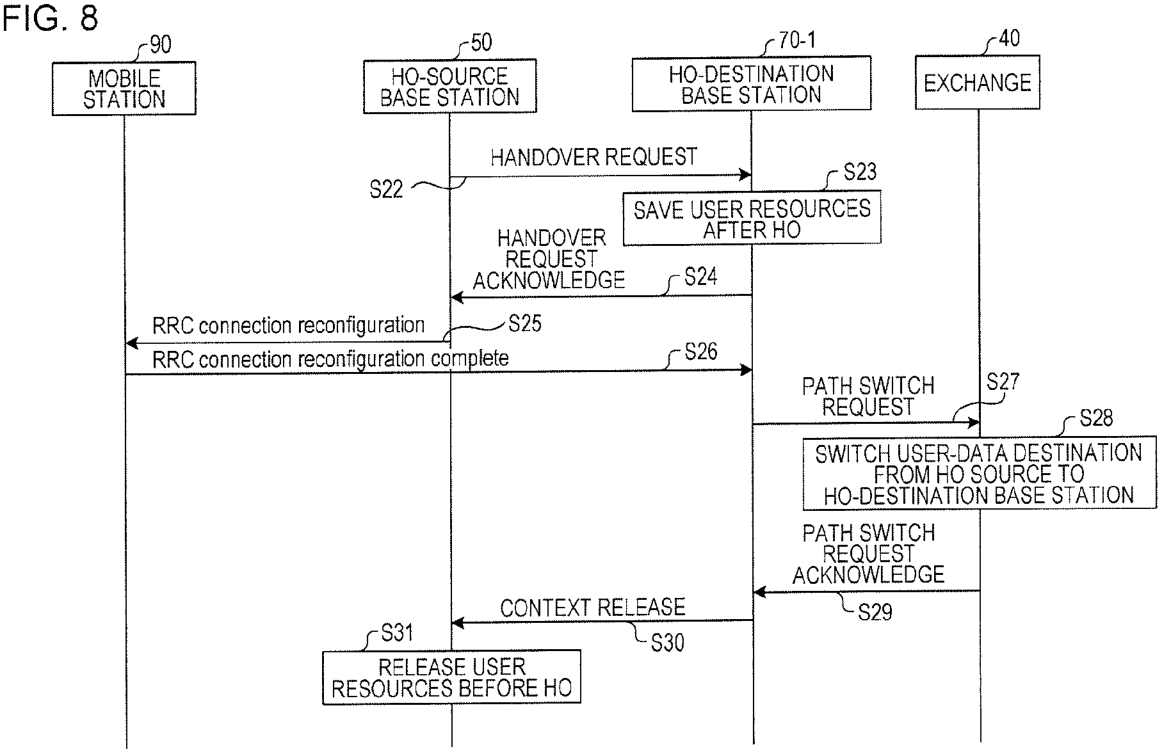

FIGS. 7 and 8 are diagrams illustrating an example of an operational sequence of a communication system, according to a second embodiment.

In the mobile station 90, the wireless-quality measuring unit 94 measures the wireless qualities between the mobile station 90 and the base stations included in the measurement target group by using reference signals transmitted from the measurement target group. The controller 91 transmits a measurement report message including the results of measurement to the HO-source base station 50 via the wireless-protocol processing unit 92 and the wireless interface unit 93 (operation S11).

In the HO-source base station 50, upon receiving the measurement report via the wireless interface unit 59 and the signal processing unit 58, the call controller 56 transmits a handover prepare request (HANDOVER PREPARE) to HO-destination-candidate base stations 70-1 and 70-2 included in the measurement target group (operation S12). The handover prepare request does not have to be transmitted to all the HO-destination-candidate base stations 70 in the measurement target group; the call controller 56 may select a HO-destination-candidate base station whose wireless quality is at a predetermined level or higher and may transmit the handover prepare request only to the selected HO-destination-candidate base station.

In the HO-destination-candidate base station 70-1, when the call controller 76 has received the handover prepare request, the total-throughput measuring unit 71 and the power-consumption measuring unit 72 measure the current total throughput and power consumption, that is, total throughput and power consumption before a handover, respectively (operation S13).

Then, the total-throughput estimating unit 73 and the power-consumption estimating unit 74 estimate total throughput and power consumption after a handover, respectively (operation S14).

Also in the HO-destination-candidate base station 70-2, the same processing operations are executed (operations S15 and S16).

In each of the HO-destination-candidate base stations 70-1 and 70-2, the call controller 76 transmits a handover prepare acknowledgement (HANDOVER PREPARE ACKNOWLEDGE) to the HO-source base station 50 (operation S17). The handover prepare acknowledgement may include measured total throughput and power consumption before a handover and estimated total throughput and power consumption after a handover.

In the HO-source base station 50, when the call controller 56 has received the handover prepare acknowledgement, the total-throughput measuring unit 51 and the power-consumption measuring unit 52 measure the current total throughput and power consumption, that is, total throughput and power consumption before a handover, respectively (operation S18).

Then, the total-throughput estimating unit 53 and the power-consumption estimating unit 54 estimate total throughput and power consumption after a handover, respectively (operation S19).

Thus, the call controller 56 acquires the parameter sets from the HO-source base station 50 and the HO-destination-candidate base stations 70-1 and 70-2.

The handover controller 57 then calculates the total energy efficiencies of a pair of the HO-source base station 50 and each of the HO-destination-candidate base stations 70 before and after a handover (operation S20). This calculation is performed for each of the HO-destination-candidate base stations 70.

The handover controller 57 then specifies a pair whose energy efficiency after a handover increases most as compared with that before a handover on the basis of the calculated energy efficiencies of the respective pairs before and after a handover. In other words, a pair whose energy efficiency after a handover increases most as compared with that before a handover is specified. The handover controller 57 then determines that the HO-destination-candidate base station 70 of the specified pair as a HO-destination base station (operation S21). In this case, it is assumed that the HO-destination-candidate base station 70-1 is selected as a HO-destination base station.

FIG. 8 is a diagram illustrating a continuation of the operational sequence in FIG. 7. In FIG. 8, the HO-destination-candidate base station 70-2, which was not selected as a HO-destination base station, is excluded for the sake of convenience.

In the HO-source base station 50, the call controller 56 transmits a handover request (HANDOVER REQUEST) to the HO-destination-candidate base station 70-1 (hereinafter referred to as a HO-destination base station 70-1), which is selected as a HO-destination base station in operation S21 (operation S22).

In the HO-destination base station 70-1, upon receiving the handover request, the call controller 76 saves acquires resources to be used after a handover (operation S23) and returns a handover request acknowledgement (HANDOVER REQUEST ACKNOWLEDGE) to the HO-source base station 50 (operation S24).

In the HO-source base station 50, upon receiving the handover request acknowledgement, the call controller 56 transmits a handover instruction (RRC connection reconfiguration) to the mobile station 90 (operation S25).

In the mobile station 90, upon receiving the handover instruction, the controller 91 switches a communication channel to a user channel for the HO-destination base station 70-1 after a handover. Then, the controller 91 transmits a handover completion (RRC connection reconfiguration complete) to the HO-destination base station 70-1 by using the switched user channel (operation S26).

In the HO-destination base station 70-1, upon receiving the handover completion, the call controller 76 transmits a path switch request (PATH SWITCH REQUEST) to the exchange 40 to switch the destination of the user data from the HO-source base station 50 to the HO-destination base station 70-1 (operation S27).

Upon receiving the path switch request, the exchange 40 switches the destination of the user data from the HO-source base station 50 to the HO-destination base station 70-1 (operation S28) and transmits a path-switch request acknowledgement (PATH SWITCH REQUEST ACKNOWLEDGE) to the HO-destination base station 70-1 (operation S29).

In the HO-destination base station 70-1, upon receiving the path-switch request acknowledgement, the call controller 76 transmits a handover completion (CONTEXT RELEASE) to the HO-source base station 50 (operation S30).

In the HO-source base station 50, upon receiving the handover completion, the call controller 56 releases the user resources acquired before the handover (operation S31).

As described above, according to the second embodiment, the same advantages as those of the first embodiment may be achieved also in the case where the handover control apparatus 10 is applied to a HO-source base station.

Third Embodiment

A third embodiment relates to a variation of a method for calculating the energy efficiency. Since the basic configurations of a HO-source base station, HO-destination-candidate base stations, and a mobile station of the third embodiment are similar to those of the second embodiment, they will be described with reference to FIGS. 4, 5, and 6.

In the HO-destination-candidate base stations 70 of the third embodiment, a calculating unit (not illustrated) calculates the energy efficiency of the HO-destination-candidate base stations 70 before and after a handover on the basis of a parameter set measured and estimated by the total-throughput measuring unit 71, the power-consumption measuring unit 72, the total-throughput estimating unit 73, and the power-consumption estimating unit 74. The results of calculation are transmitted to the HO-source base station 50.

Furthermore, in the HO-source base station 50 of the third embodiment, the handover controller 57 calculates the energy efficiency of the HO-source base station 50 before and after a handover on the basis of a parameter set measured and estimated by the total-throughput measuring unit 51, the power-consumption measuring unit 52, the total-throughput estimating unit 53, and the power-consumption estimating unit 54.

The handover controller 57 calculates the total energy efficiency of a pair of the HO-source base station 50 and HO-destination-candidate base station 70 before and after a handover, on the basis of the energy efficiency calculated in each HO-destination-candidate base station 70 before and after a handover and the energy efficiency calculated by the handover controller 57 before and after a handover. This calculation is performed for each of the HO-destination-candidate base stations 70.

The handover controller 57 specifies a pair whose total energy efficiency after a handover increases most compared with that before a handover on the basis of the calculated total energy efficiencies of the respective pairs before and after a handover. The handover controller 57 selects the HO-destination-candidate base station 70 of the specified pair as a HO-destination base station.

Here, the following equations may be used to calculate the total energy efficiency:

$$\mathrm{Eff}\_1=(R\_1, 1/W\_1, 1)+(R\_1, 2/W\_1, 2)$$

$$\mathrm{Eff}\_2=(R\_2, 1/W\_2, 1)+(R\_2, 2/W\_2, 2)$$

In this way, it is also possible to obtain the total energy efficiencies of the respective pairs before and after a handover by using the above-mentioned equations.

Figure 9:
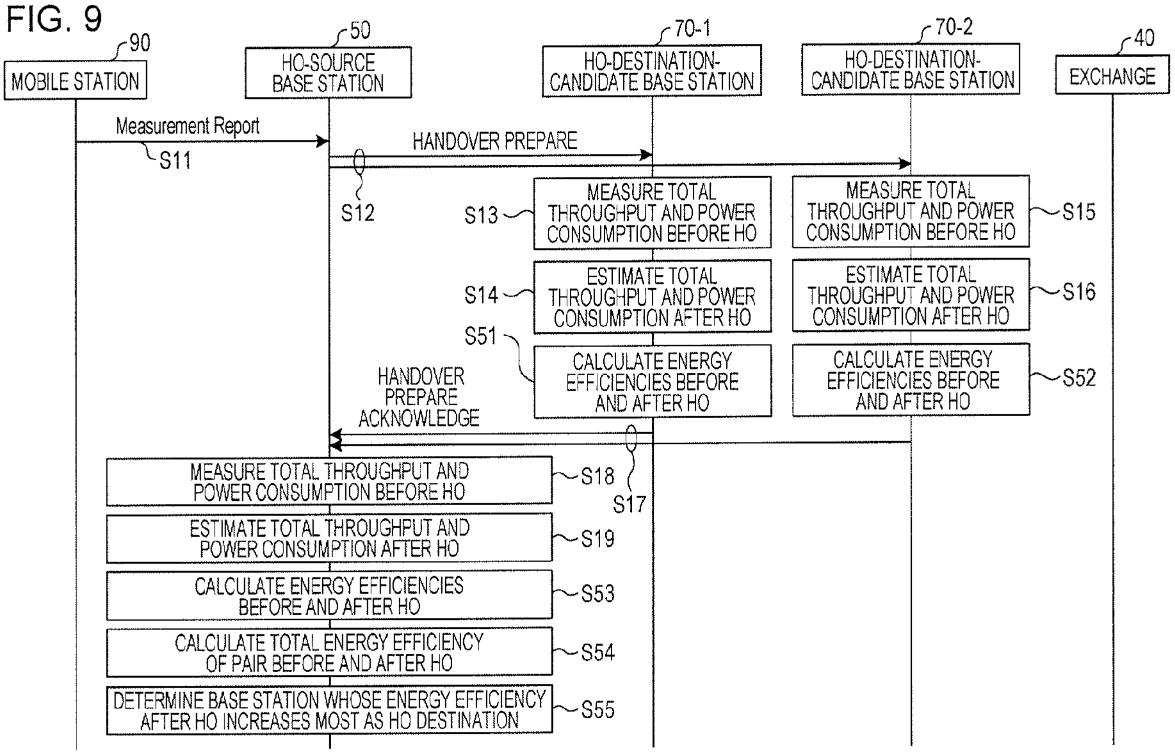
FIG. 9 is a diagram illustrating an example of an operational sequence of a communication system, according to a third embodiment.

FIG. 9 is a diagram illustrating an example of an operational sequence of a communication system, according to a third embodiment.

In the HO-destination-candidate base station 70-1, a calculating unit (not illustrated) calculates the energy efficiency of the HO-destination-candidate base station 70-1 before and after a handover on the basis of the parameter set measured and estimated in operations S13 and S14 (operation S51).

Also in HO-destination-candidate base station 70-2, the same processing operation is executed (operation S52).

In the HO-source base station 50, the handover controller 57 calculates the energy efficiency of the HO-source base station 50 before and after a handover on the basis of the parameter set measured and estimated in operation S18 and operation S19 (operation S53).

Then, the handover controller 57 calculates the total energy efficiency of a pair of the HO-source base station 50 and HO-destination-candidate base station 70 before and after a handover for each of the HO-destination-candidate base stations 70-1 and 70-2 (operation S54).

The handover controller 57 then specifies a pair whose energy efficiency after a handover increases most as compared with that before a handover on the basis of the calculated energy efficiencies of the respective pairs before and after a handover. In other words, a pair whose energy efficiency after a handover increases most as compared with that before a handover is specified. The handover controller 57 then determines that the HO-destination-candidate base station 70 of the specified pair as a HO-destination base station (operation S55). Here, assuming that the HO-destination-candidate base station 70-1 is selected as a HO-destination base station, the same sequence as that in FIG. 8 is further executed.

As described above, the handover control using the energy efficiencies of the individual pairs before and after a handover obtained by the method of the third embodiment may also offer the same advantages as those of the first embodiment.

Fourth Embodiment

A fourth embodiment is an embodiment in which a handover control apparatus is separate from a base station.

Configuration of Handover Control Apparatus

Figure 10:
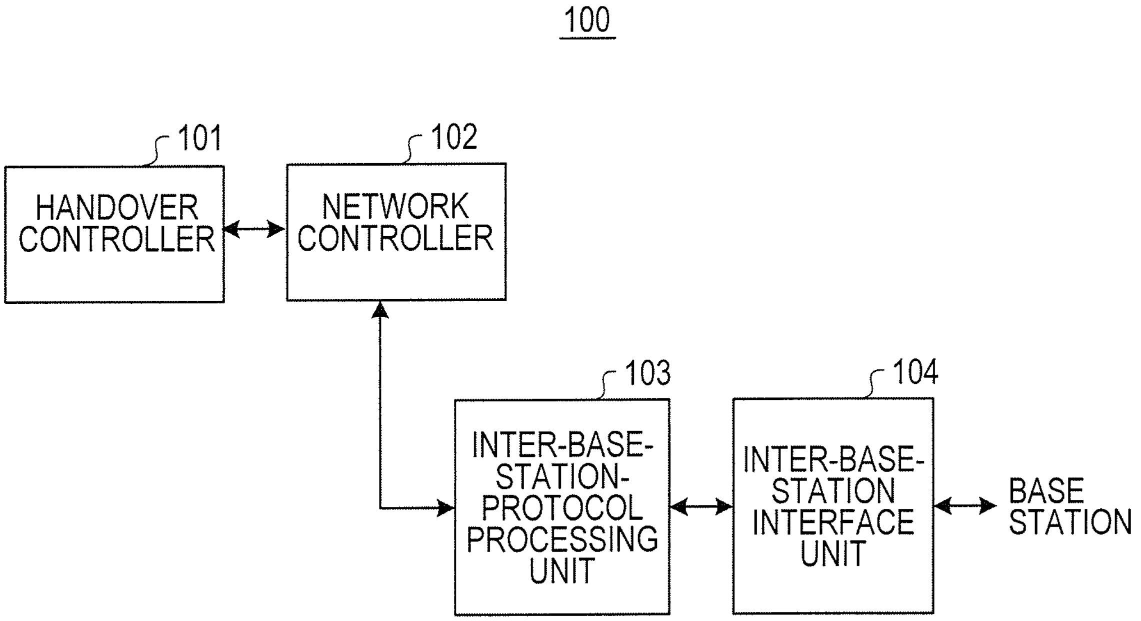
FIG. 10 is a diagram illustrating a configuration example of a handover control apparatus, according to a fourth embodiment.

FIG. 10 is a diagram illustrating a configuration example of a handover control apparatus, according to a fourth embodiment. In FIG. 10, a handover control apparatus 100 includes a handover controller 101, a network controller 102, an inter-base-station-protocol processing unit 103, and an inter-base-station interface unit 104. Here, the acquisition unit 11 of the handover control apparatus 10 corresponds to the network controller 102, and the handover controller 12 corresponds to the handover controller 101.

The handover controller 101 has the same function as that of the above-mentioned handover controller 12.

The network controller 102 transmits and receives control signals to and from a HO-source base station 110 or a HO-destination-candidate base stations 120, to be described later, in accordance with a calling process sequence. The network controller 102 acquires parameter sets from the HO-source base station 110 or the HO-destination-candidate base stations 120.

The inter-base-station-protocol processing unit 103 terminates an inter-base-station protocol for the HO-source base station 110 or the HO-destination-candidate base stations 120.

The inter-base-station interface unit 104 transmits and receives signals to and from the HO-source base station 110 or the HO-destination-candidate base stations 120 via a transmission path.

Configuration of HO-Source Base Station

Figure 11:
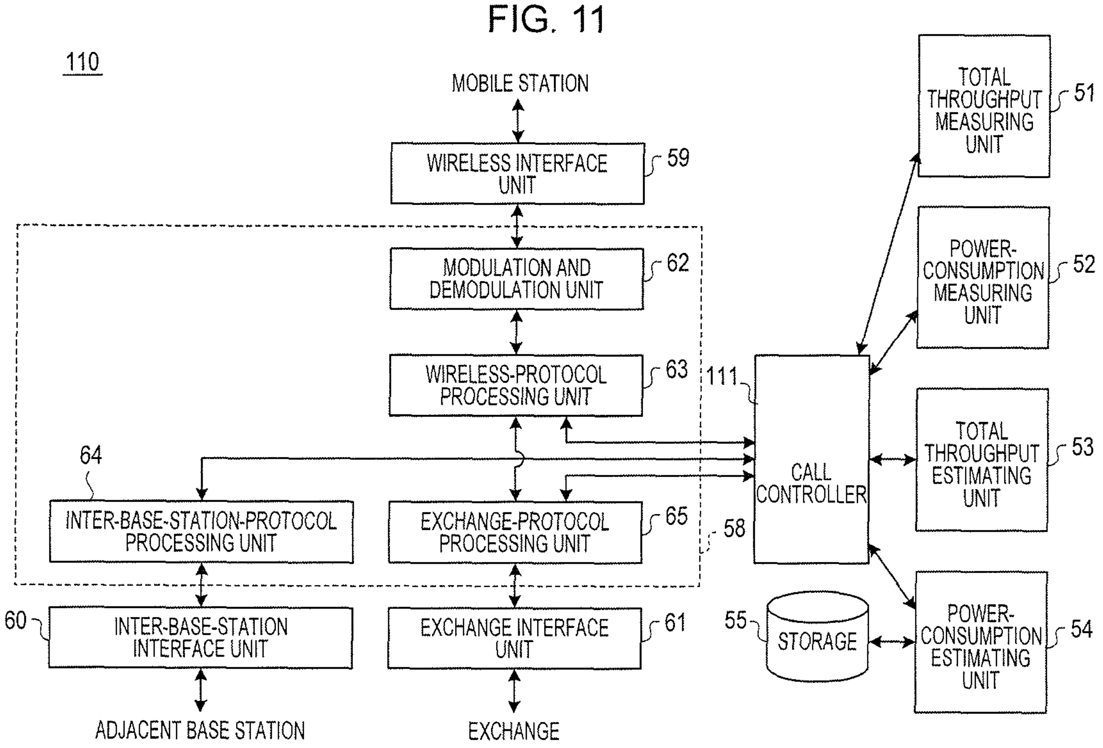
FIG. 11 is a diagram illustrating a configuration example of a handover-source base station, according to a fourth embodiment.

FIG. 11 is a diagram illustrating a configuration example of a handover-source base station, according to a fourth embodiment. In FIG. 11, the HO-source base station 110 includes a call controller 111.

The call controller 111 transmits and receives control signals to and from HO-destination-candidate base stations 120, the mobile station 90, the handover control apparatus 100, or the exchange 40, in accordance with a call processing sequence. The call controller 111 transmits parameter sets measured or estimated by the HO-source base station 110 to the handover control apparatus 100.

Configuration of HO-Destination-Candidate Base Station

Figure 12:
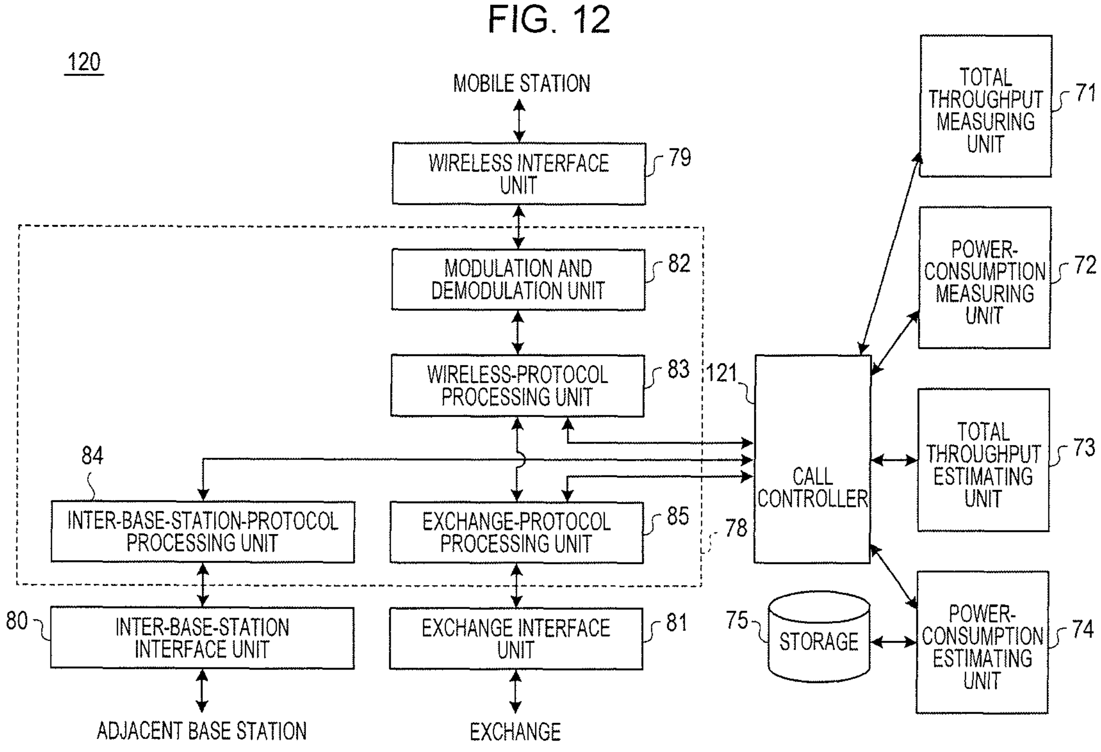
FIG. 12 is a diagram illustrating a configuration example of a handover-destination-candidate base station, according to a fourth embodiment.

FIG. 12 is a diagram illustrating a configuration example of a handover-destination-candidate base station, according to a fourth embodiment. In FIG. 12, the HO-destination-candidate base stations 120 each include a call controller 121.

The call controller 121 transmits and receives control signals to and from the HO-source base station 110, the mobile station 90, the handover control apparatus 100, or the exchange 40, in accordance with a call processing sequence. The call controller 121 transmits a parameter set measured or estimated by the HO-destination-candidate base station 120 to the handover control apparatus 100.

Operation of Communication System

Figure 13:
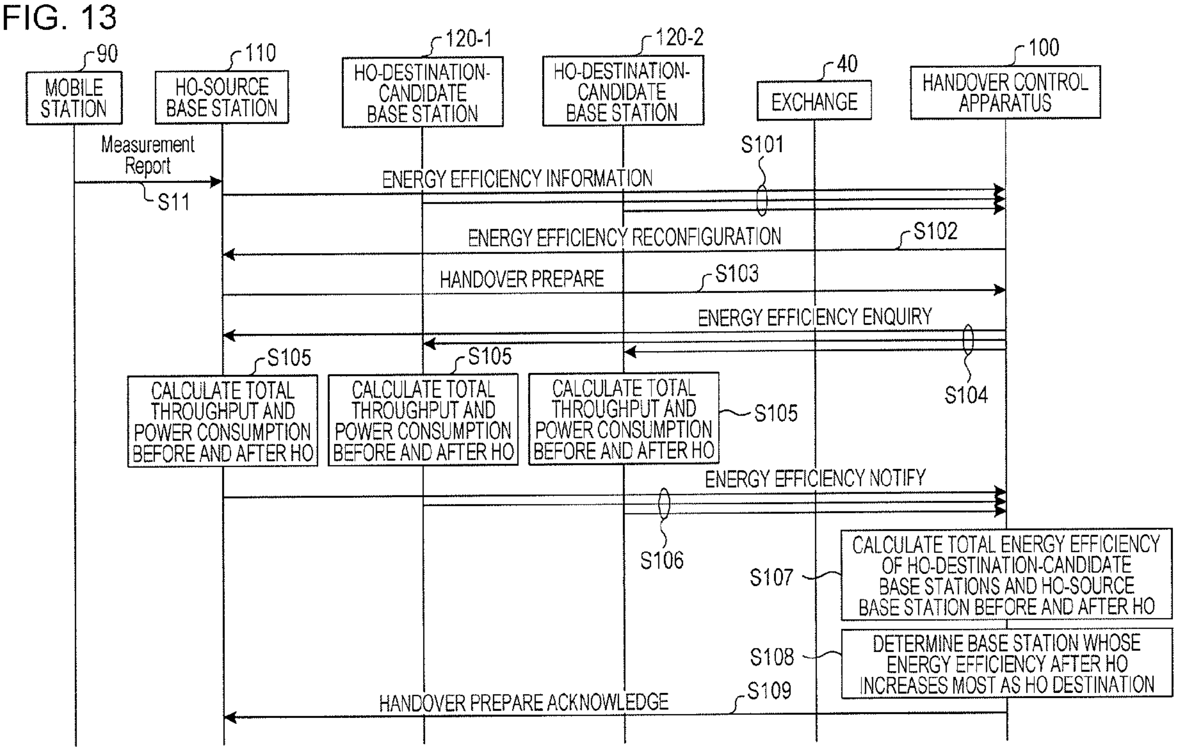
FIG. 13 is a diagram illustrating an example of an operational sequence of a communication system, according to a fourth embodiment.

FIG. 13 is a diagram illustrating an example of an operational sequence of a communication system, according to a fourth embodiment.

In the HO-source base station 110, the call controller 111 causes the total-throughput measuring unit 51, the power-consumption measuring unit 52, the total-throughput estimating unit 53, and the power-consumption estimating unit 54 to regularly measure and estimate the total throughput and power consumption, thereby regularly acquiring a parameter set. A calculating unit (not illustrated) calculates the energy efficiency of the HO-source base station 110 before and after a handover, and the call controller 111 transmits the results of calculation to the handover control apparatus 100 (operation S101). The results of measurement are stored in energy efficiency information (ENERGY EFFICIENCY INFORMATION) which is transmitted to the handover control apparatus 100.

Furthermore, also in each of the HO-destination-candidate base stations 120, the call controller 121 causes the total-throughput measuring unit 71, the power-consumption measuring unit 72, the total-throughput estimating unit 73, and the power-consumption estimating unit 74 to regularly measure and estimate the total throughput and power consumption, thereby regularly acquiring a parameter set. A calculating unit (not illustrated) calculates the energy efficiency of the HO-destination-candidate base station 120 before and after a handover, and the call controller 121 transmits the results of calculation to the handover control apparatus 100 (operation S101).

In the handover control apparatus 100, the handover controller 101 determines whether a base station whose energy efficiency has decreased is present on the basis of the energy efficiencies before and after the handover transmitted from the HO-source base station 110 and the HO-destination-candidate base stations 120. In this determination process, when the energy efficiency has decreased to a threshold value or less, it is determined that the energy efficiency has decreased. As a result of determination, when it is determined that a base station whose energy efficiency has decreased is present, the network controller 102 transmits an energy efficiency reconfiguration request (ENERGY EFFICIENCY RECONFIGURATION) to the base station whose energy efficiency has decreased (in this case, the HO-source base station 110) (operation S102).

In the HO-source base station 110, when the call controller 111 has received the energy efficiency reconfiguration request via the signal processing unit 58 and the wireless interface unit 59, the call controller 111 transmits a handover prepare request (HANDOVER PREPARE) to the handover control apparatus 100 (operation S103). The call controller 111 may select a HO-destination-candidate base station whose wireless quality is at a predetermined level or more before transmitting the handover prepare request and may transmit the handover prepare request including information on the selected HO-destination-candidate base station.

In the handover control apparatus 100, upon receiving the handover prepare request, the network controller 102 transmits an energy efficiency enquiry request (ENERGY EFFICIENCY ENQUIRY) to each base station in the measurement target group of the mobile station 90 (operation S104).

In the HO-source base station 110, when the call controller 111 has received the energy efficiency enquiry request, the total-throughput measuring unit 51, the power-consumption measuring unit 52, the total-throughput estimating unit 53, and the power-consumption estimating unit 54 measure and estimate the total throughput and power consumption again. The calculating unit (not illustrated) calculates the energy efficiency of the HO-source base station 110 before and after a handover (operation S105), and the call controller 111 transmits the results of calculation to the handover control apparatus 100 (operation S106). The results of calculation are stored in ENERGY EFFICIENCY NOTIFY which is transmitted to the handover control apparatus 100.

Also in each of the HO-destination-candidate base stations 120, when the call controller 121 has received the energy efficiency enquiry request, the total-throughput measuring unit 71, the power-consumption measuring unit 72, the total-throughput estimating unit 73, and the power-consumption estimating unit 74 measure and estimate the total throughput and the power consumption again. Then, the calculating unit (not illustrated) calculates the energy efficiency of the HO-destination-candidate base stations 120 before and after a handover (operation S105), and the call controller 121 transmits the results of calculation to the handover control apparatus 100 (operation S106).

In the handover control apparatus 100, when the network controller 102 has received the results of calculation in operation S106, the handover controller 101 calculates the total energy efficiency of a pair of the HO-source base station 110 and HO-destination-candidate base station 120 before and after a handover (operation S107). The calculation is performed for each of the individual HO-destination-candidate base stations 120.

Then, the handover controller 101 specifies a pair whose energy efficiency after a handover increases most as compared with that before the handover on the basis of the calculated energy efficiencies of the individual pairs before and after a handover. In other words, a pair whose energy efficiency after a handover increases most as compared with that before a handover is specified. The handover controller 101 then determines the HO-destination -candidate base station of the specified pair as a HO-destination base station (operation S108).

The network controller 102 transmits a handover prepare acknowledgement (HANDOVER PREPARE ACKNOWLEDGE) including information on the determined HO-destination base station to the HO-source base station 110 (operation S109). Here, assuming that the HO-destination-candidate base station 70-1 is selected as a HO-destination base station, the same sequence as that in FIG. 8 is further executed.

As described above, the fourth embodiment may offer the same advantages as those of the first embodiment even if the handover control apparatus 10 is separate from the base station.

Other Embodiments

[1] Although the first to fourth embodiments have been described on the assumption that handover control is executed with a measurement report transmitted from a mobile station to a HO-source base station as a trigger, it is not limited thereto; the individual base stations may autonomously perform handover control.

Examples of a trigger for the individual base stations to autonomously execute handover control are as follows:

(A) Regularly: Handover control is executed at regular intervals. However, when all the base stations execute handover control at the same intervals, handovers may occur at the same time. Therefore, it is desirable to provide jitter (that is, fluctuation in the regular intervals) by using random numbers for the individual base stations.

(B) The time when the energy efficiency of the base station has decreased: Handover control is executed when the energy efficiency of the base station has decreased to a threshold value or less.

The acquisition unit 11 acquires parameter sets at regular intervals or when the energy efficiency of the HO-source base station has decreased. Then, the handover controller 12 executes the process of calculating the total energy efficiency of the individual pairs before and after a handover and the process of selecting a handover-destination base station, described above, in synchronization with the timing at which the parameter sets are acquired by the acquisition unit 11.

In order to execute handover control with trigger (A) or (B), a target mobile station needs to be selected. In this case, a mobile station group whose wireless quality is low is selected from mobile station groups present under the control of the base station.

[2] In the first to fourth embodiments, instead of the throughput, a value obtained by dividing the total sum of actual throughputs on the individual wireless resources accommodated in the base station by the total sum of the maximum throughputs that is achievable within the standards of the individual wireless resources may be used. For example, in the case where 2×2 MIMO is applied to a 3.9 G mobile communication system using a frequency band of 20 MHz, the maximum downward throughput that is achievable on standard wireless resources is about 150 Mbps.

[3] The base station 50 and the mobile station 90 of the first to fourth embodiments may be implemented by the following hardware configuration.

Figure 14:
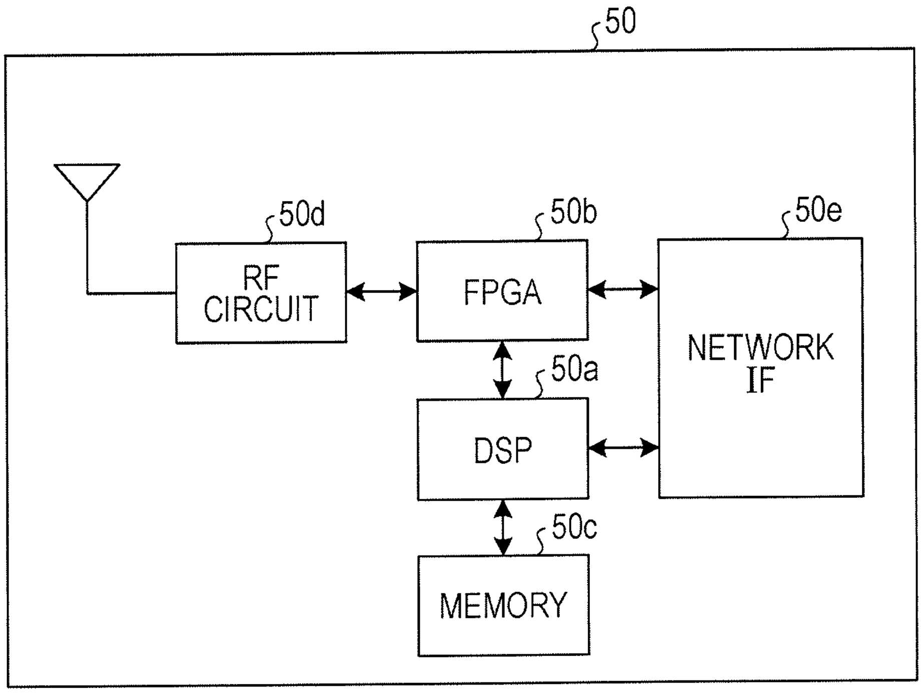
FIG. 14 is a diagram illustrating an example of a hardware configuration of a base station, according to an embodiment.

FIG. 14 is a diagram illustrating an example of a hardware configuration of a base station, according to an embodiment. As illustrated in FIG. 14, the base station 50 includes, as hardware components, a digital signal processor (DSP) 50*a*, a field programmable gate array (FPGA) 50*b*, a memory 50*c*, a radio frequency (RF) circuit 50*d*, and a network interface (IF) 50*e*. The DSP 50*a* and the FPGA 50*b* are connected via the network IF 50*e*, such as a switch, so that various signals and data are input and output thereto and therefrom. The RF circuit 50*d* has an antenna. Examples of the memory 50*c* include a RAM, such as a synchronous dynamic random access memory (SDRAM), a read-only memory (ROM), and a flash memory. The total-throughput measuring unit 51, the power-consumption measuring unit 52, the total-throughput estimating unit 53, the power-consumption estimating unit 54, the call controller 56, and the handover controller 57 are each implemented using an integrated circuit, such as the DSP 50*a* and the FPGA 50*b*. The wireless interface unit 59 is implemented using the RF circuit 50*d*. The inter-base-station interface unit 60 and the exchange interface unit 61 are implemented using the network IF 50*e*. The storage 55 is implemented using the memory 50*c*. This also applies to the base stations 70, 110, and 120. The handover control apparatus 100 may be configured as the same hardware configuration as that of the base station 50. For example, the handover controller 101, the network controller 102, and the inter-base-station-protocol processing unit 103 are each implemented using an integrated circuit, such as a DSP and an FPGA. The inter-base-station interface unit 104 is implemented using a network IF.

Figure 15:
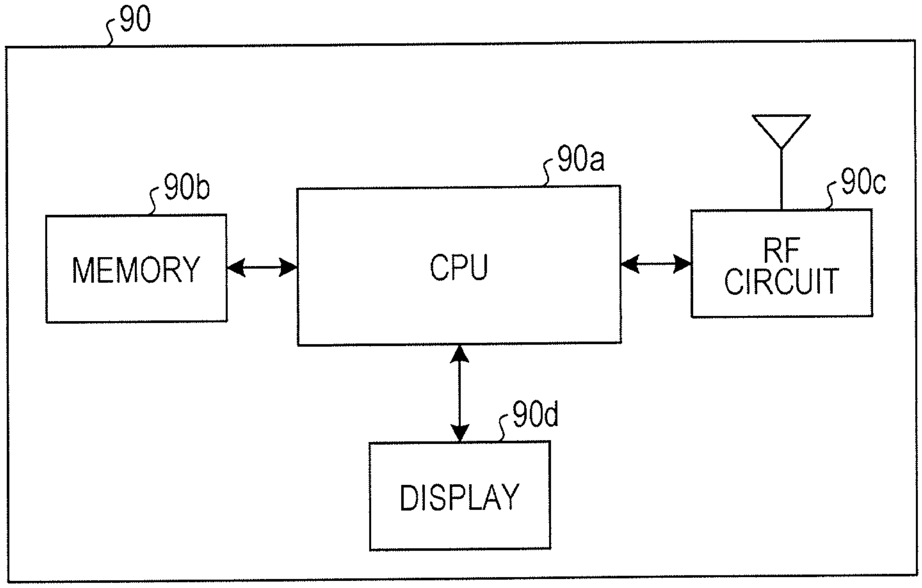
FIG. 15 is a diagram illustrating an example of a hardware configuration of a mobile station, according to an embodiment.

FIG. 15 is a diagram illustrating an example of a hardware configuration of a mobile station, according to an embodiment. As illustrated in FIG. 15, the mobile station 90 includes, as hardware components, a central processing unit (CPU) 90*a*, a memory 90*b*, an RF circuit 90*c* having an antenna, and a display 90*d*, such as a liquid crystal display (LCD). Examples of the memory 90*b* include a RAM, such as an SDRAM, a ROM, and a flash memory. The wireless interface unit 93 is implemented by the RF circuit 90*c*. The controller 91, the wireless-protocol processing unit 92, and the wireless-quality measuring unit 94 are each implemented by an integrated circuit, such as the CPU 90*a*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for controlling selection of a handover destination of a mobile station, the apparatus comprising:

an acquisition unit configured to acquire a parameter set including first and second parameter subsets, the first parameter subset comprising a first throughput and a first power consumption that are measured, before a handover of the mobile station, by each of base stations belonging to a measurement target group including a plurality of handover-candidate base stations and a handover-source base station, the handover-source base station being a base station from which the mobile station is to be handed over to the handover-destination, the first throughput being measured based on the wireless quality between the mobile station and the each base station belonging to the measurement target group, the second parameter subset comprising a second throughput and a second power consumption that are estimated by the each base station belonging to the measurement target group, on an assumption that the mobile station is handed over to the each base station; and a controller configured:

to calculate, before the handover of the mobile station and on the assumption that the mobile station is handed over, for each of the plurality of handover-candidate base stations, a total energy efficiency for a pair of the handover-source base station and the each of the plurality of handover-candidate base stations, based on the respective parameter set, and to select a handover-destination base station to which the mobile station is to be handed over from the handover-source base station, from among the plurality of handover-candidate base stations, based on the total energy efficiencies that have been calculated, before the handover and on the assumption that the mobile station is handed over, for the respective plurality of handover-candidate base stations.

2. The apparatus of claim 1, wherein the total energy efficiency is calculated as the ratio of a throughput of a pair of the handover-source base station and each of the plurality of candidate base stations, to a power consumption of a pair of the handover-source base station and the each of the plurality of candidate base stations.

3. The apparatus according to claim 1, wherein the acquisition unit acquires the parameter set at predetermined intervals or when an energy efficiency of the handover-source base station has decreased; and the controller calculates the total energy efficiencies and selects the handover-destination base station, in synchronization with a timing at which the acquisition unit acquires the parameter set.

4. A mobile station for controlling selection of a handover destination, the mobile station comprising:

a measuring unit configured to measure a wireless quality between the mobile station and base stations belonging to a measurement target group including a handover-source base station that is in communication with the mobile station and a plurality of handover-candidate base stations located around the handover-source base station, based on reference signals transmitted from the base stations belonging to the measurement target group;

a communicating unit configured:

to transmit a report including the measured wireless quality of the respective base stations belonging to the measurement target group to the handover-source base station, and to receive, from the handover-source base station, a message including information on a handover-destination base station selected from the plurality of handover-candidate base stations; and a controller configured to switch a communication channel from a first channel coupled to the handover-source base station to a second channel coupled to the handover-destination base station, based on the received message.

wherein the measured wireless quality of the respective base stations are a parameter set;

wherein the parameter set comprises throughput and power consumption of the respective base stations; and wherein the parameter set is included within the report transmitted in the message to the controller.

5. A method for controlling selection of a handover destination of a mobile station, the method comprising:

acquiring a parameter set including first and second parameter subsets, the first parameter subset comprising a first throughput and a first power consumption that are measured, before a handover of the mobile station, by each of base stations belonging to a measurement target group including a plurality of handover-candidate base stations and a handover-source base station, the handover-source base station being a base station from which the mobile station is to be handed over to a handover-destination base station, the first throughput being measured based on wireless quality between the mobile station and the each base station belonging to the measurement target group, the second parameter subset including, in association with the each base station, second throughput and second power consumption that are estimated by the each base station on an assumption that the mobile station is handed over to the each base station belonging to the measurement target group;

calculating, before the handover and on an assumption that the mobile station is handed over, for each of the plurality of handover-candidate base stations, a total energy efficiency of a pair of the handover-source base station and the each of the plurality of handover-candidate base stations, based on the parameter set; and selecting the handover-destination base station, from among the plurality of handover-candidate base stations, based on the respective total energy efficiencies that have been calculated, before the handover, and on the assumption that the mobile station is handed over, for the respective plurality of handover-candidate base stations.

* * * * *